(12) United States Patent
Raad

(10) Patent No.: US 9,698,661 B2
(45) Date of Patent: Jul. 4, 2017

(54) HYBRID HOMOPOLAR INTEGRATED STARTER-GENERATOR

(71) Applicant: Bernard Anthony Raad, West Linn, OR (US)

(72) Inventor: Bernard Anthony Raad, West Linn, OR (US)

(73) Assignee: OECO, LLC, Milwaukie, OR (US)

( * ) Notice: Subject to any disclaimer, the term of this patent is extended or adjusted under 35 U.S.C. 154(b) by 860 days.

(21) Appl. No.: 13/758,270

(22) Filed: Feb. 4, 2013

(65) Prior Publication Data

US 2013/0200741 A1   Aug. 8, 2013

Related U.S. Application Data

(60) Provisional application No. 61/594,151, filed on Feb. 2, 2012.

(51) Int. Cl.
*H02K 31/00* (2006.01)
*H02K 21/04* (2006.01)
*H02P 9/30* (2006.01)

(52) U.S. Cl.
CPC .......... *H02K 31/00* (2013.01); *H02K 21/046* (2013.01); *H02P 9/305* (2013.01)

(58) Field of Classification Search
USPC ........................................ 310/178
See application file for complete search history.

(56) References Cited

U.S. PATENT DOCUMENTS

| 4,134,054 | A | * | 1/1979 | Akamatsu | H02K 19/20 310/112 |
|---|---|---|---|---|---|
| 6,097,124 | A | * | 8/2000 | Rao | H02K 21/046 310/156.48 |
| 6,392,370 | B1 | * | 5/2002 | Bedini | H02K 21/24 310/113 |
| 2004/0145265 | A1 | * | 7/2004 | Heiberger | F16C 39/06 310/178 |
| 2005/0140236 | A1 | * | 6/2005 | Jeong | H02K 1/2766 310/156.53 |
| 2011/0037336 | A1 | * | 2/2011 | Smith | H02K 21/20 310/178 |

* cited by examiner

*Primary Examiner* — Naishadh Desai
(74) *Attorney, Agent, or Firm* — Kelley Drye & Warren LLP

(57) ABSTRACT

An integrated starter-generator (ISG) utilizes a dedicated, properly sized start box for the starting function, and a fully controllable hybrid homopolar machine with a generator control unit (GCU) for the generate function. The hybrid homopolar machine may comprise a permanent magnet (PM) section that is supplemented by a homopolar field section, which results in a regulated output voltage by either boosting or bucking the voltage out of the PM section vectorially through a common stator.

15 Claims, 6 Drawing Sheets

HYBRID HOMOPOLAR INTEGRATED STARTER-GENERATOR

CROSS REFERENCE TO RELATED APPLICATIONS

This application is a relates to, and claims the benefit of the earlier filing date and priority of U.S. Provisional Patent Application No. 61/594,151, filed Feb. 2, 2012, and entitled "Hybrid Homopolar Integrated Starter Generator."

BACKGROUND OF THE INVENTION

The subject matter disclosed herein relates to integrated starter-generators and, in particular, to an integrated starter-generator having a fully controllable hybrid homopolar machine with a generator control unit for the generate function and a dedicated start box for the starting function.

Recent evolutions in Military Vehicle technology require a relatively dramatic increase in electric power generation to accommodate larger and more sophisticated electrical loads and to migrate away from other forms of power such as hydraulic and pneumatic, which are not as efficient or as controllable as electric power. This trend is commonly referred to as the "More Electric Vehicle" and though it is prevalent in the military world, it is also making inroads in the commercial environment.

To meet this trend, designers are requiring relatively larger generators and converters with the current power ceiling somewhere around 120 kVA. Hybrid-electric vehicles top out at even higher power requirements, for example in the 200 to 300 kVA range.

While existing integrated starter generators are somewhat suitable for existing needs, what is needed is an integrated starter generator that includes the improvements of embodiments of the present invention.

BRIEF DESCRIPTION OF THE INVENTION

According to an embodiment of the invention, an integrated starter-generator (ISG) utilizes a dedicated, properly sized start box for the starting function, and a fully controllable hybrid homopolar machine with a generator control unit (GCU) for the generate function. The hybrid homopolar machine may comprise a permanent magnet (PM) section that is supplemented by a homopolar field section, which results in a regulated output voltage by either boosting or bucking the voltage out of the PM section vectorially through a common stator.

These and other advantages and features will become more apparent from the following description taken in conjunction with the drawings, in which like reference symbols refer to like elements.

BRIEF DESCRIPTION OF THE DRAWING

The foregoing and other features and advantages of the invention are apparent from the following detailed description taken in conjunction with the accompanying drawings in which.

The detailed description explains embodiments of the invention, together with advantages and features, by way of example with reference to the drawings.

DETAILED DESCRIPTION OF THE INVENTION

Figure 1:
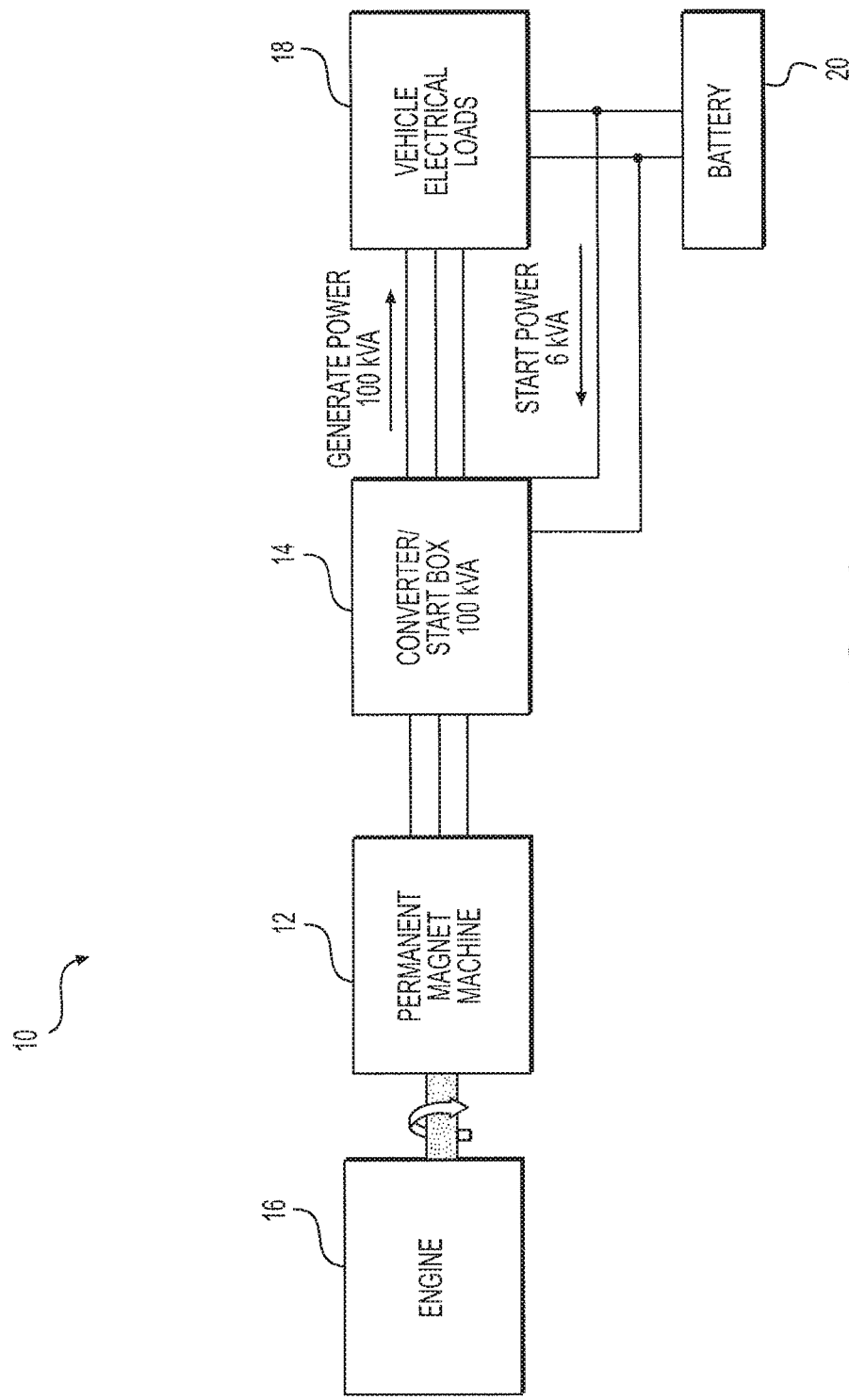
FIG. 1 is a block diagram of an integrated starter-generator according to the prior art.

Referring to FIG. 1, there illustrated is a known integrated starter-generator 10 according to the prior art. Such modern, known integrated starter-generators (ISG) 10 used on military vehicles typically comprise a permanent magnet machine (PMM) 12 and a relatively large power converter 14. The PMM 12 is typically mechanically connected with the engine 16, while the power converter 14 supplies electrical power to various vehicle electrical loads 18. A battery 20 is also connected with the power converter 14.

To reduce its economic impact, the prior art integrated starter-generator 10 of FIG. 1 typically combines the starting and the generating functions. Thus, the ISG 10 is used to start the engine and, once self-sustaining speed is attained, the ISG 10 begins generating electricity by converting mechanical power from the engine 16. Therefore a typical system capable of generating, for example, 100 kVA, commonly comprises not only a permanent magnet machine 12 typically rated at 100 kVA, but also a power converter 14, also rated at 100 kVA. This is usually required for the generate function. The same equipment is used during start, although the start requirement typically requires only a relatively small fraction (e.g., approximately 6 kVA) of the total capacity of the ISG 10. This mismatch results in an ISG 10 that is relatively overweight, of higher cost and lower efficiency than it needs to be.

Figure 2:
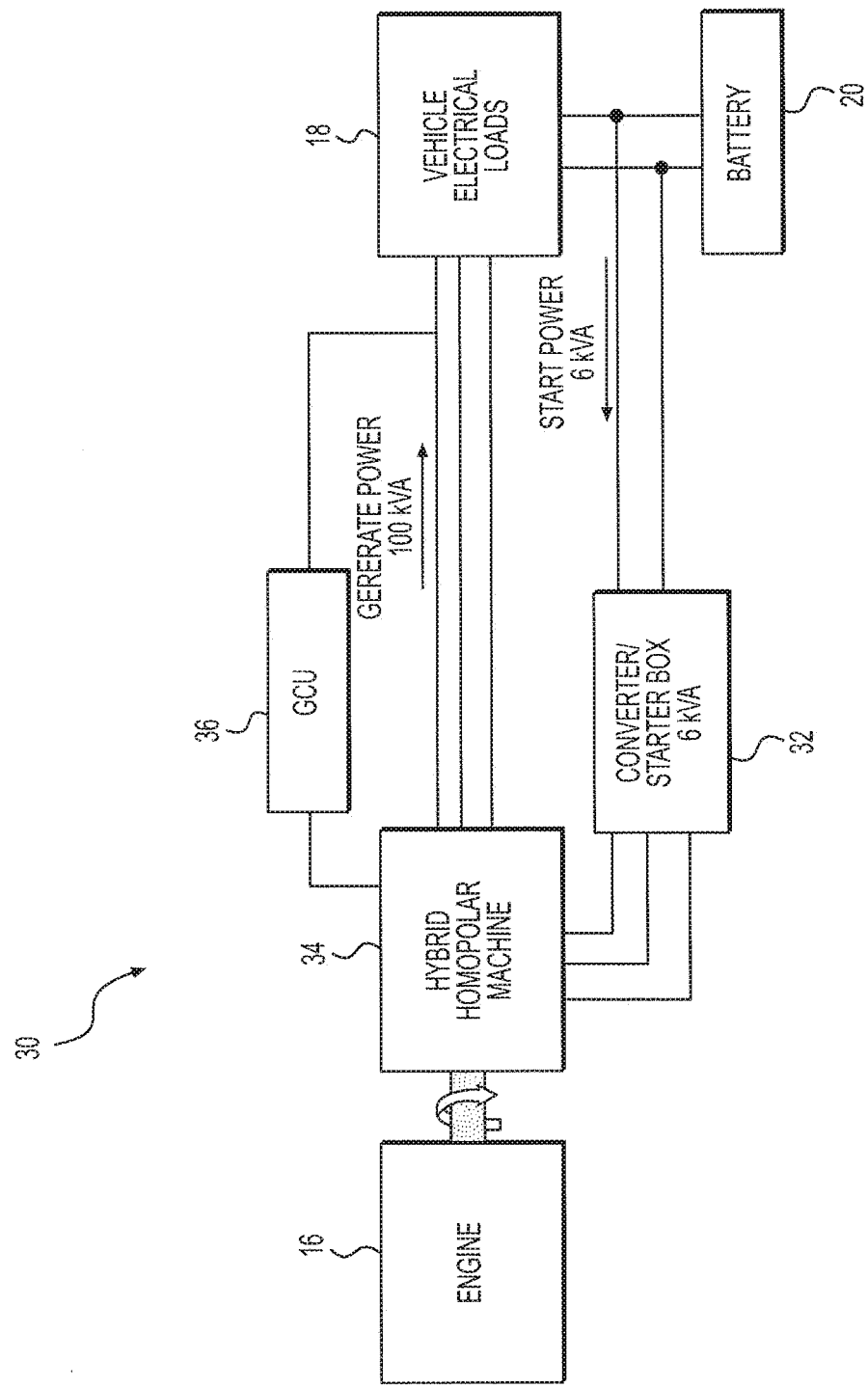
FIG. 2 is a block diagram of an integrated starter-generator according to embodiments of the present invention.

Referring to FIG. 2, there is illustrated a block diagram of an embodiment of an integrated starter-generator 30 in accordance with embodiments of the present invention. Like reference numerals are utilized to designate like components throughout the drawings herein. The embodiment of the ISG 30 of FIG. 2 includes an internal combustion engine (ICE) 16 mechanically coupled to a hybrid homopolar machine 34. The hybrid homopolar machine 34 is connected to a dedicated, properly sized start box 32 for the starting function. The hybrid homopolar machine 34 is electrically coupled to, and controlled or regulated by, at least in terms of voltage output, a generator control unit 36 (GCU) for the electricity generating function. The hybrid homopolar machine 34 may be coupled to one or more vehicle electrical loads 18, as well as one or more batteries 20, and the converter/start box 32.

Figure 3:
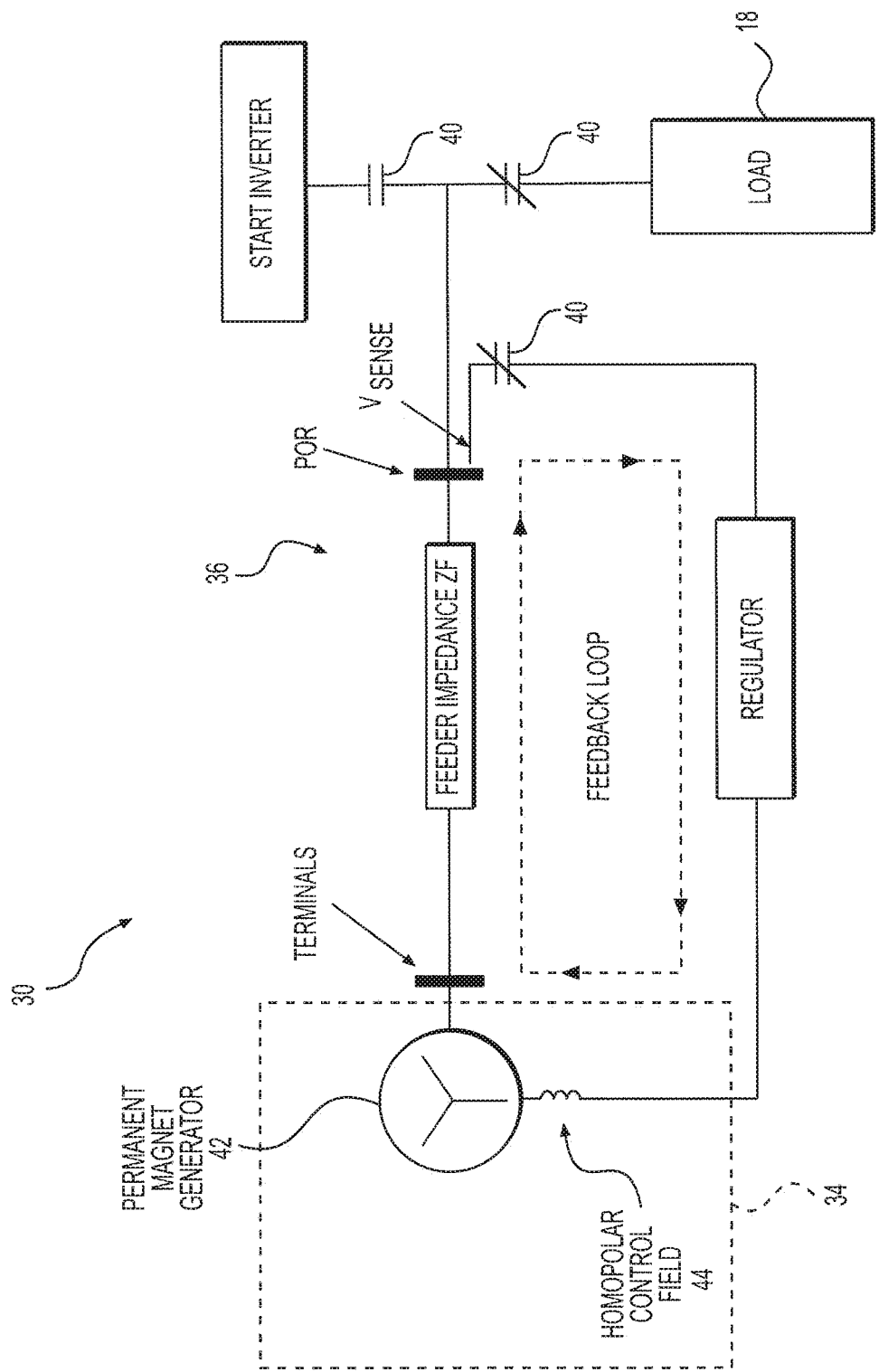
FIG. 3 is a schematic illustration of the integrated starter-generator of FIG. 2 of embodiments of the present invention in the generate mode of operation.

With reference to FIG. 3, in an embodiment, the hybrid homopolar machine 34 may comprise a permanent magnet (PM) section 42 that is supplemented by a homopolar control field section 44, which combination may provide a regulated output voltage that may be boosted or bucked vectorially through a common stator. The resulting integrated starter-generator of embodiments of the present invention may be referred to herein as a Hybrid Homopolar Integrated Starter Generator 30 (HHISG).

Embodiments of the HHISG 30 of the present invention incorporate a hybrid homopolar machine 34 that uses a permanent magnet motor/generator (PMG) 42 coupled to a homopolar section 44. This allows the use of the hybrid homopolar machine 34 for engine start with the aid of a simple power converter 32 (FIG. 2) sized for that function, and as a controlled generator in the generate mode, using a generator control unit or set of control electronics 36. Voltage control (regulation) is achieved by utilizing the homopolar sections to vectorially buck (subtract from) or boost (add to) the voltage output of the PMG 42. Benefits over known, prior art ISGs are reduced cost and weight.

Figure 4:
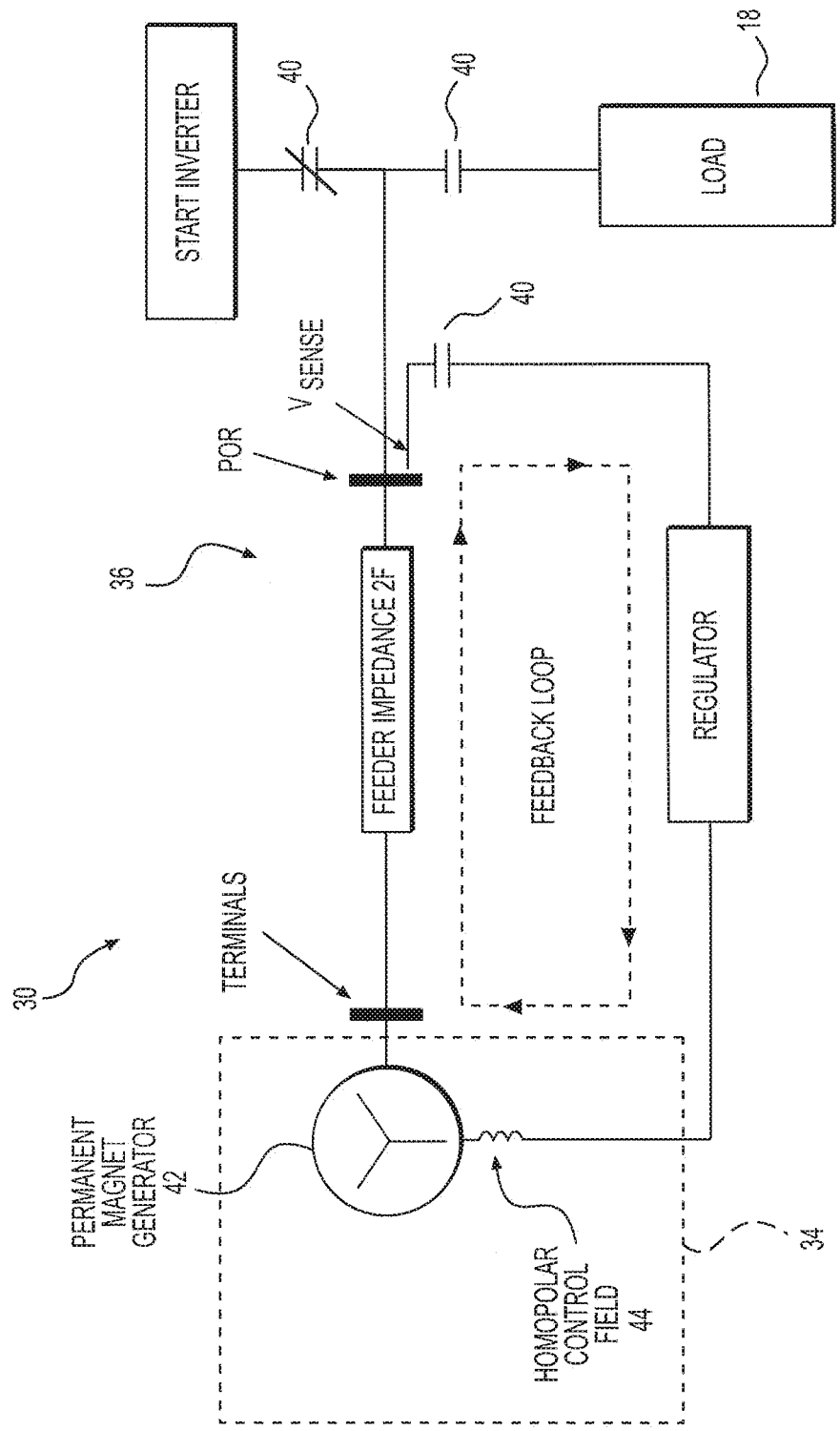
FIG. 4 is a schematic illustration of the integrated starter-generator of FIG. 2 of embodiments of the present invention in the start mode of operation.

FIG. 3 schematically illustrates the integrated starter generator 30 of embodiments of the present invention in the electricity generate mode of operation. Note the open and closed contactors or switches 40. In contrast, FIG. 4 schematically illustrates the integrated starter generator 30 of embodiments of the present invention in the engine start mode of operation. Again, note the open and closed contactors 40.

Figure 5:
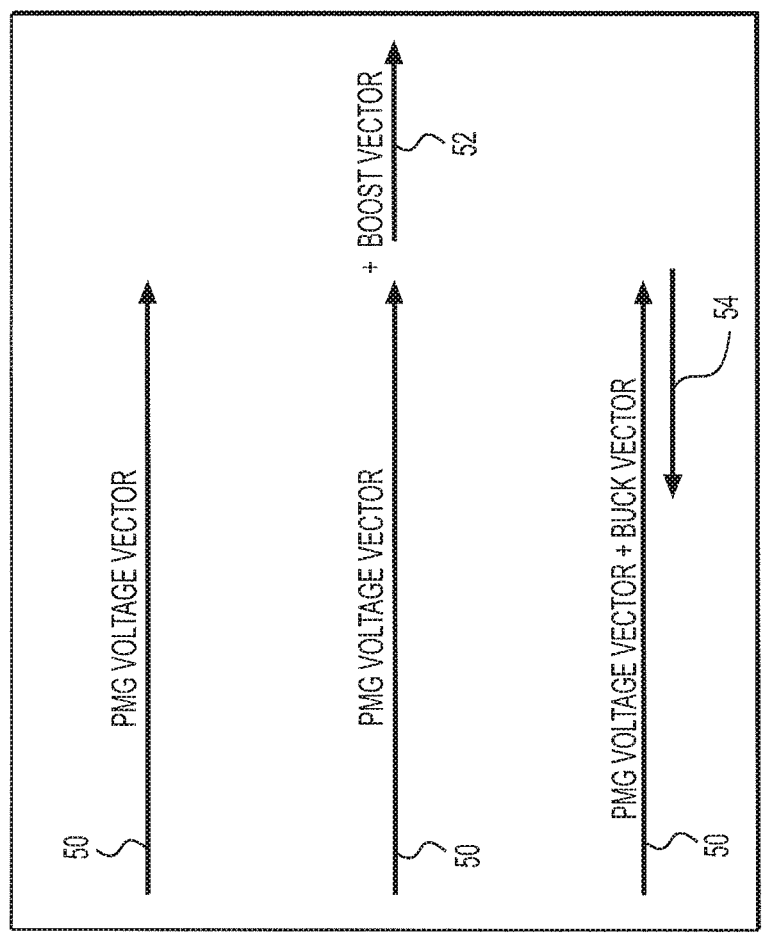
FIG. 5 is an illustration of the PMG voltage vector alone, and together with a boost vector and a buck vector, respectively.

Referring to FIG. 5, in the generate mode of operation, the integrated starter-generator 30 of the embodiments of the present invention shown in FIGS. 2-4 and 6 operate as a regulated permanent magnet generator (PMG) 42. With reference to FIG. 3, the homopolar control field section 44 comprises a means for voltage regulation, which permits a vectorial buck or boost of the voltage output of the PMG 42, with the stator acting as a summing device for the combined voltage output of the homopolar control field section 44 and the PMG 42. Shown in FIG. 5 is the PMG voltage vector 50 alone, then below that in combination with an example of a boost vector 52, and below that in combination with an example of a buck vector 54. It is appreciated that the magnitude of a boost vector 52 or buck vector 54 may vary between zero and any practicable upper limit.

Figure 6:
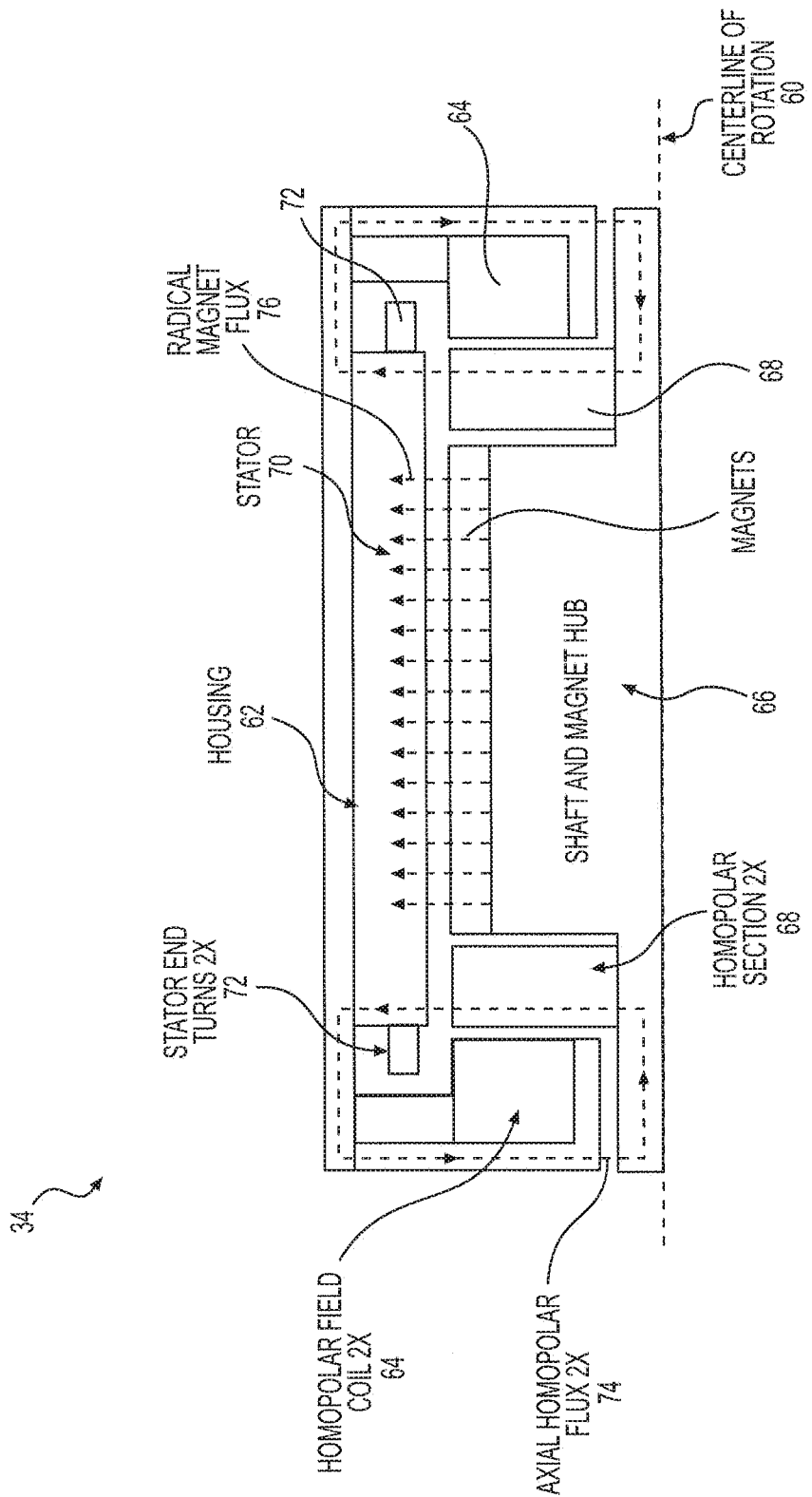
FIG. 6 is a cross section of an internal arrangement of various components of the integrated starter-generator of FIG. 2 of embodiments of the present invention.

Referring to FIG. 6, there illustrated is a cross section view of an example of the internal arrangement of various components of the hybrid homopolar integrated starter-generator (HHISG) 30 of embodiments of the present invention—more specifically, of the hybrid homopolar machine 34 of FIG. 2. The cross section view of FIG. 6 is a longitudinal section view through a cylindrical embodiment of the device 34, although only half of the components are shown for clarity and simplicity—those components located above the centerline of rotation 60. Within an outer housing 62 is located one or more homopolar field coils 64. The homopolar field coils 64 may each be made up of windings of conductive material. A shaft and permanent magnet hub 66 which provides an electric motor generator rotor is also shown to be disposed within the housing 62 and between the one or more homopolar field coils 64. One or more homopolar magnetic elements or sections 68 may be disposed coaxially with the shaft and spaced longitudinally along the shaft between the permanent magnet rotor 66 and the one or more homopolar field coils 64. An air gap may be provided between the one or more homopolar field coils 64 and the adjacent one or more homopolar magnetic elements 68, and between the one or more homopolar magnetic elements 68 and adjacent permanent magnetic rotor section 66. As shown, the one or more homopolar field coils 64 may be located longitudinally outside of the homopolar magnetic elements 68 relative to the location of the permanent magnetic rotor element 66.

With continued reference to FIG. 6, also shown is a stator 70 with an end turn 72 at each end of the stator 70. Arrows illustrate the direction of the axial homopolar flux 74 as well as the radial magnet flux 76, respectively. The stator 70 may be disposed outside of and coaxial with the permanent magnet rotor section 66 and have an axial longitudinal dimension which is greater than an axial longitudinal dimension of the permanent magnet rotor section. The stator 70 may further surround, at least in part, the one or more homopolar magnetic elements 68. As shown, the stator 70 may have a longitudinal dimension which preferably is coextensive with the longitudinal dimension of the permanent magnet rotor section 66 combined with that of the one or more homopolar magnetic elements 68.

Embodiments of the HHISG 30 of the present invention provide advantages in over prior art integrated starter-generators 10 (FIG. 1) in terms of relatively lower cost, reduced weight, and greater efficiency.

The integrated starter-generator of embodiments of the present invention have been described and illustrated herein. However, it is to be understood that alternative features may be incorporated in various other embodiments of the present invention. For example, the integrated starter-generator may include a rotor position sensor to maximize its torque production per ampere of electrical current. Also, the homopolar field may be utilized during the start mode of operation to supplement torque production, if needed. Further, instead of two homopolar sections as utilized and shown herein, a single homopolar section may be utilized on one side of the PG machine. Finally, a single homopolar section flanked by two permanent magnet sections that may achieve a similar effect may be utilized. In this case each PM section may have its own configuration advantage.

While the invention has been described in detail in connection with a number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. An integrated starter generator for an internal combustion engine, comprising:
   a permanent magnet rotor section provided on a shaft having a longitudinal rotational centerline, said permanent magnet rotor section being proximal to a first longitudinal end of the shaft;
   a first homopolar magnetic element provided on the shaft adjacent to the permanent magnet rotor section along the longitudinal centerline of the shaft and closer to the first longitudinal end of the shaft than the permanent magnet rotor section; and
   a first homopolar field coil disposed adjacent to the first homopolar magnetic element, wherein the first homopolar magnetic element is disposed along the longitudinal centerline of the shaft between and adjacent to the permanent magnet rotor section and the first homopolar field coil.

2. The integrated starter generator of claim 1, further comprising a generator control unit electrically coupled to the integrated starter generator.

3. The integrated starter generator of claim 1, further comprising:
   a second homopolar magnetic element disposed adjacent to the permanent magnet rotor section and coaxial with the shaft, wherein the second homopolar magnetic element is disposed at an end of the permanent magnet rotor section furthest from the first homopolar magnetic element; and a second homopolar field coil disposed adjacent to the second homopolar magnetic element.

4. The integrated starter generator of claim 3, further comprising:

a stator disposed outside of and coaxial with the permanent magnet rotor section, wherein the stator has an axial longitudinal dimension which is greater than an axial longitudinal dimension of the permanent magnet rotor section, and wherein the stator surrounds, at least in part, the first and second homopolar magnetic elements.

5. The integrated starter generator of claim 4, wherein the first homopolar field coil is disposed further from the permanent magnet rotor section than from the first homopolar magnetic element.

6. The integrated starter generator of claim 3, wherein the first homopolar field coil is disposed further from the permanent magnet rotor section than from the first homopolar magnetic element, and wherein the second homopolar field coil is disposed further from the permanent magnet rotor section than from the second homopolar magnetic element.

7. The integrated starter generator of claim 1, further comprising:

a stator disposed outside of and coaxial with the permanent magnet rotor section, wherein the stator has an axial longitudinal dimension which is greater than an axial longitudinal dimension of the permanent magnet rotor section, and wherein the stator surrounds, at least in part, the first homopolar magnetic element.

8. The integrated starter generator of claim 2, wherein an air gap is provided between the permanent magnet rotor section and the first homopolar magnetic element.

9. An integrated starter generator for an internal combustion engine, comprising:

a permanent magnet rotor section provided on a shaft having a longitudinal centerline, said permanent magnet rotor section being proximal to a first longitudinal end of the shaft;

a stator surrounding the permanent magnet rotor section, wherein said permanent magnet rotor section and stator collectively comprise a permanent magnet motor/generator (PMG);

a first homopolar magnetic element provided on the shaft adjacent to the PMG along the longitudinal centerline of the shaft and closer to the first longitudinal end of the shaft than the permanent magnet rotor section;

a first homopolar field coil disposed adjacent to the first homopolar magnetic element; and means for regulating a voltage output of the integrated starter generator.

10. The integrated starter generator of claim 9, further comprising:

a second homopolar magnetic element provided on the shaft adjacent to the PMG;

a second homopolar field coil disposed adjacent to the second homopolar magnetic element.

11. The integrated starter generator of claim 10, wherein the stator has an axial longitudinal dimension which is greater than an axial longitudinal dimension of the permanent magnet rotor section.

12. The integrated starter generator of claim 10, wherein the first homopolar field coil is disposed further from the permanent magnet rotor section than from the first homopolar magnetic element.

13. The integrated starter generator of claim 1, further comprising:

a stator surrounding the permanent magnet rotor section, wherein said permanent magnet rotor section and stator collectively comprise a permanent magnet motor/generator (PMG), and a voltage output regulator for the integrated starter generator, wherein the first homopolar magnetic element is provided on the shaft adjacent to the PMG.

14. The integrated starter generator of claim 1, wherein the permanent magnet rotor section is coaxial with the shaft.

15. The integrated starter generator of claim 14, wherein the permanent magnet rotor section is mounted coaxially on the shaft.

* * * * *